(12) United States Patent
Vastmans et al.

(10) Patent No.: US 8,355,615 B2
(45) Date of Patent: Jan. 15, 2013

(54) SPLICE CLOSURE AND FIBRE ORGANISER DEVICE

(75) Inventors: Kristof Vastmans, Boutersem (BE); Roel Modest Willy Bryon, Aarschot (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 394 days.

(21) Appl. No.: 12/663,664

(22) PCT Filed: May 20, 2008

(86) PCT No.: PCT/GB2008/050362
§ 371 (c)(1),
(2), (4) Date: Dec. 8, 2009

(87) PCT Pub. No.: WO2008/149131
PCT Pub. Date: Dec. 11, 2008

(65) Prior Publication Data
US 2010/0178021 A1 Jul. 15, 2010

(30) Foreign Application Priority Data
Jun. 8, 2007 (GB) .................................. 0710990.3

(51) Int. Cl.
*G02B 6/00* (2006.01)
(52) U.S. Cl. ......................................... 385/135; 174/93
(58) Field of Classification Search ................... 385/135
See application file for complete search history.

(56) References Cited

U.S. PATENT DOCUMENTS

| 4,435,038 A * | 3/1984 | Soes et al. ....................... 385/70 |
| 4,498,732 A * | 2/1985 | Campbell et al. ............. 385/135 |
| 5,515,472 A | 5/1996 | Mullaney |
| 5,844,171 A * | 12/1998 | Fitzgerald ........................ 174/92 |
| 5,997,186 A * | 12/1999 | Huynh et al. .................... 385/99 |
| 7,113,687 B2 * | 9/2006 | Womack et al. .............. 385/135 |
| 2007/0104447 A1* | 5/2007 | Allen ............................. 385/135 |
| 2008/0226250 A1* | 9/2008 | Gonzales et al. ............. 385/135 |

FOREIGN PATENT DOCUMENTS

| GB | 1 507 313 A | 4/1978 |
| WO | WO 03/077394 A | 9/2003 |

OTHER PUBLICATIONS

International Search Report and Written Opinion for PCT/GB2008/050362 issued by the European Patent Office dated Dec. 23, 2008.

* cited by examiner

*Primary Examiner* — Hemang Sanghavi
(74) *Attorney, Agent, or Firm* — Faegre Baker Daniels LLP

(57) ABSTRACT

A splice closure and fiber organizer device (10) comprises a substantially elongate body 5 member (12), closure member (16) and a foldable organizer tray (14) for accommodating at least one fiber splice and/or length(s) of excess fiber. The organizer tray which includes a plurality of fold lines (21) provided by respective living hinges is capable of being wrapped around part of the bodymember, into a generally cylindrical or part cylindrical shape, to close or partially close the closure. The fold lines enable the organizer tray to be folded into an extra 10 dimension, from a flat planar structure into a generally cylindrical or part cylindrical shape. This enables the closure to be more compact without compromising the bend control radius characteristics of the organizer tray. By restricting the minimum bend radius of the organizer to that of the fiber to be used bend control of installed fiber can be readily achieved. The device is particularly suitable for use in FTTX applications.

33 Claims, 3 Drawing Sheets

SPLICE CLOSURE AND FIBRE ORGANISER DEVICE

This invention relates to optical fibre management and in particular concerns a splice closure and fibre organiser device for fibre management in the context of fibre to the home applications (FTT/H/P/X), hereinafter referred to as FTTH.

Fibre to the home (FTTH) concerns the installation of optical fibres in the subscriber loop of telecommunications networks either instead of or to replace twisted copper pairs. At the present time there are two leading technologies for providing high speed access to telecommunications networks from the home or business premises, namely DSL Broadband which utilises existing copper pairs and FTTH. FTTH is on average ten times faster than DSL Broadband and is inherently non-asymmetric in the sense that FTTH network connections operate at substantially the same speed in both directions. Emerging high speed services such as high definition IPTV and the like are driving the requirement for higher speed access and consequently FTTH is emerging as the preferred high speed access technology, particularly for new homes and business premises where there is no existing network infrastructure.

It is often necessary to run an optical fibre drop cable from an existing distribution box or cable closure to the building (home or business premises) and in many situations it is not always possible to pull the cable directly to the connection point in the building from one direction. This problem is often overcome by pulling lengths of drop cable from the distribution box or cable closure side and from the building side and connecting the lengths of cable together at an appropriate location. These connections are usually made within the building and are often located in areas having restricted access for example in the roof space. There are often regulatory restrictions on the size and location of such cable splice connections and there is presently a requirement for a cable splice closure and a fibre organiser which is not only small and compact for installation in poorly accessible or space restricted areas but is also relatively easy to handle and install.

According to an aspect of the present invention there is provided a splice closure and fibre organiser device comprising a substantially elongate body and a foldable organiser tray for accommodating at least one fibre splice and/or length(s) of excess fibre, the said tray having a plurality of fold lines and being capable of being wrapped around at least part of the said body, into a generally cylindrical or part cylindrical shape, to close or partially close the closure.

In the closure and organiser of the aforementioned aspect of the invention, it is possible to connect indoor and outdoor lengths of optical fibre drop cable by using known splice methods and organise cable splices and excess lengths of fibre in a convenient and easy to manage way. The fold lines enable the organiser tray to be folded into an extra dimension, that is to say from a flat planar structure into a generally cylindrical or part cylindrical shape. This enables the closure to be more compact without compromising the bend control radius characteristics of the organiser tray. By restricting the minimum bend radius of the organiser to that of the fibre to be used bend control of installed fibre can be readily achieved. In preferred embodiments the organiser tray comprises a plurality of adjacent parallel strips hinged together along their respective adjoining edges. The adjoining edges of adjacent strips of the organiser tray may be joined together by respective living hinges, living hinges may be co-moulded with the strips of the organiser tray, for example the organiser tray may be divided into a series of strips with a living hinge between each pair of adjacent strips the thickness of which may between 0.2 and 0.5 mm but preferably between 0.3 and 0.4 mm. Living hinges have the advantage that when suitably designed it is difficult for articles to become entrapped within the hinge. This is particularly advantageous in the context of optical fibre management where relatively small diameter fibres can easily become trapped between the relative moving parts of the hinge.

In embodiments where the living hinges are co-moulded with the strips it is possible to mould the organiser tray as a single item. In this way both the cost and mechanical complexity of the organiser tray can be minimised without compromising the structural integrity and functionality of the foldable organiser tray.

In an alternative embodiment the adjoining adjacent strips of the organiser tray may be joined together by respective mechanical hinges. Such embodiments may be desirable where a robust structure is required.

In preferred embodiments the organiser tray is also pivotally connected to the body. Preferably this pivotal connection is also provided by a hinge, preferably a living hinge. The organiser tray and body portion may therefore be co-moulded to provide an integral unitary structure.

Preferably the organiser tray is closed against the body when the organiser tray is wrapped around it. In this way the open side of the organiser tray supporting the splices and/or excess lengths of fibre can be closed by wrapping the open side around the body of the device.

In preferred embodiments the body comprises at least one cable termination retention means for securing incoming/outgoing cables with respect to the body. In this way it is possible to provide for strain relief of the incoming/outgoing cables by utilising known strain relief cable termination devices for incoming/outgoing cables, which termination devices can be securely fixed to the body of the device by the termination retention means. This is important in the context of joining optical fibre cables which are provided with so called strength members for supporting tensile loads acting on lengths of the cable. In the context of joining lengths of cable together it is important that the respective strength members are securely fixed to the structure holding the cable termination devices. In one preferred embodiment two cable termination retention means are provided for securing the terminated ends of two cables which are to be spliced. In this way it is possible for the installation engineer to secure the terminated ends of the respective cables and subsequently manipulate the respective lengths of fibre which are to be spliced safe in the knowledge that the cables are securely fixed and provided with strain relief protection in the event of unintentional mishandling of the fibre during splicing.

In preferred embodiments the cable termination retention means is/are located on one side of the body with the organiser tray being located on the other side of the body when wrapped around that part of the body. The present inventors have found that this has particular advantages in terms of fibre management as it enables the lengths of fibre extending from the ends of the terminated cables to be more readily routed into and around the folded organiser tray. The inventors found that in arrangements where the cables are routed into the body on the same side of the body as that occupied by the folded organiser tray it can be difficult to direct the over length fibre from the cable terminals into the organiser due to various spatial constraints restricting the ability of the fibre to follow a desired path without stressing the fibre.

The body may be in the shape of a half cylinder with the organiser tray pivotally connected along one of its sides to the half cylinder along one of the cylinder's axial edges. In such embodiments the unfolded substantially planar organiser tray may extend radially outwards on one side of the half cylindrical body so that the unfolded structure has one side which is substantially flat and suitable for attachment to a flat surface or the like and another side which is defined by the other side of the unfolded tray and the adjoining rounded surface of the half cylinder.

Preferably the retention means is/are located on an outward facing surface of a substantially planar part of the half-cylinder and the organiser is arranged to be wrapped around the non-planar part of the half-cylinder.

The splice closure and organiser according to the above aspect of the invention may further comprise a closure member. In embodiments where the organiser is pivotally connected along one of its side edges to the body of the device, the organiser may be pivotally connected along its other side to the closure member so that the closure member is capable of being brought into proximity with the body to close the other side of the body, that is to say the side that is not closed by the folded organiser tray. Preferably the closure member is also in the shape of a half-cylinder. The closure member half-cylinder may have a shape and size substantially the same as the body so that when the half-cylinders are brought together they define co-operating halves of a cylindrical closure. In this way one or more cable splices may be wholly enclosed within the device including the terminated ends of the cables to be spliced.

In preferred embodiments the interior of the half-cylindrical closure member may include at least one guide means for guiding incoming/outgoing cables within the enclosed region of the device. The guide means may provide support for the incoming/outgoing cables fed into the closure device.

The device of the aforementioned aspect of the invention may have a generally circular cross-section, however the present invention also contemplates other cylindrical cross-sections including substantially circular and non-circular cross-sections. For example, the organiser tray may be constructed with fold lines that provide for non-circular cross-sections when wrapped around the body part of an non-circular device. Embodiments having a circular cross-section are preferred where the intended application may require the splice closure and organiser device to be inserted in a circular cross-section conduit such as a pipe or the like, particularly if the diameter of the device is similar to that of the pipe in which it is to be located. It is envisaged that devices of the present invention will be used in this way as cable/fibre is often routed in conduit type circular cross-section pipes.

The splice closure and organiser device may have a diameter in the range of 10 to 60 mm, preferably 14 to 40 mm, more preferably 20 to 30 mm and most preferably in the region of about 25 mm. The diameter of the device will be determined to some extent by the minimum bend radius of the fibre being spliced, and although a typical diameter may be 25 mm or so smaller diameters are possible for applications which utilise fibre having a very small minimum bend diameter. At the present time fibres having a minimum bend diameter of approximately 7 mm are known and therefore relatively small diameter devices are also envisaged.

Typical axial length dimensions of the device of the present invention may be in the region of 75 to 100 mm, preferably 80 to 90 mm and most preferably about 85 mm.

The aforementioned length and diameter dimensions provide for embodiments which are relatively easy to handle and also install preferably without, or with the minimum use of, installation tools, thereby enabling the installation engineer to install such devices by hand.

The splice closure and organiser device of the present invention may be of a unitary one piece construction which may be an integrally moulded entity, for example moulded plastics material. In a preferred embodiment the device is moulded from a thermoplastics material.

Various embodiments will now be more particularly described, by way of example only, with reference to the accompanying drawings, in which.

Figure 1:
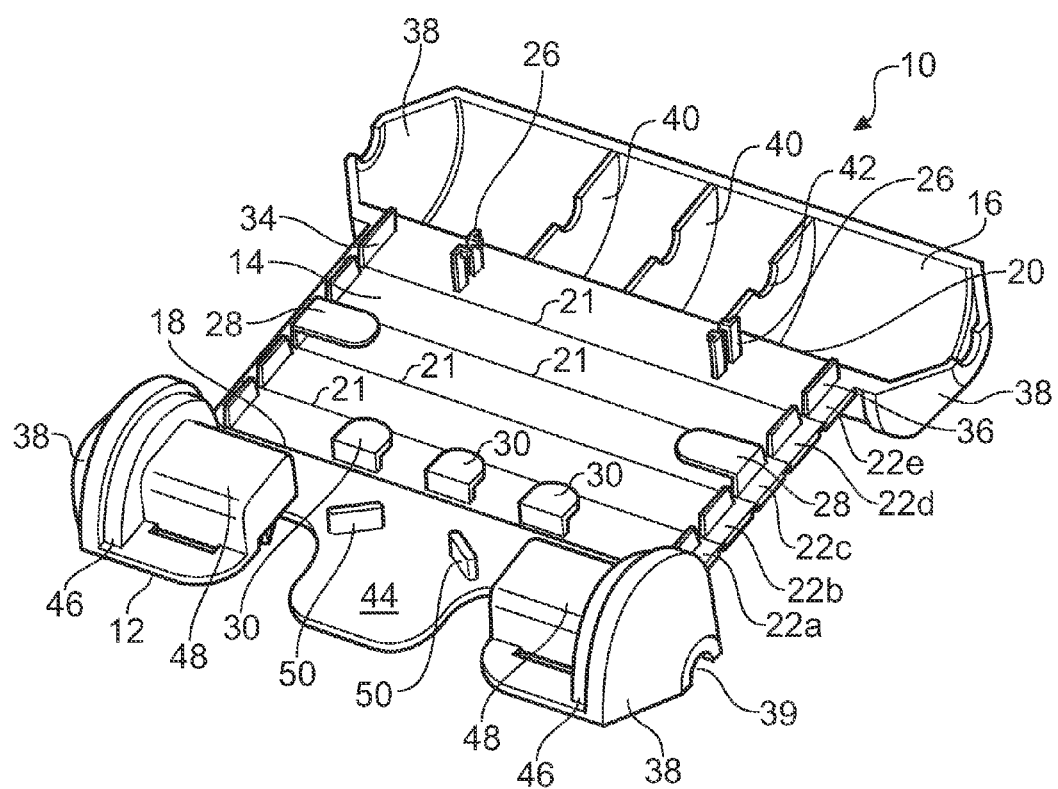
FIG. 1 is a perspective view of a splice closure and organiser device according to an embodiment of the present invention.

Referring to FIG. 1, there is shown an optical fibre cable splice closure and fibre organiser device 10 for use in connecting/splicing incoming/outgoing optical fibre cables. The device 10 includes three main parts including a generally elongate body member 12, an organiser tray 14 and a closure member 16 which is substantially the same size as the body member 12.

Figure 2:
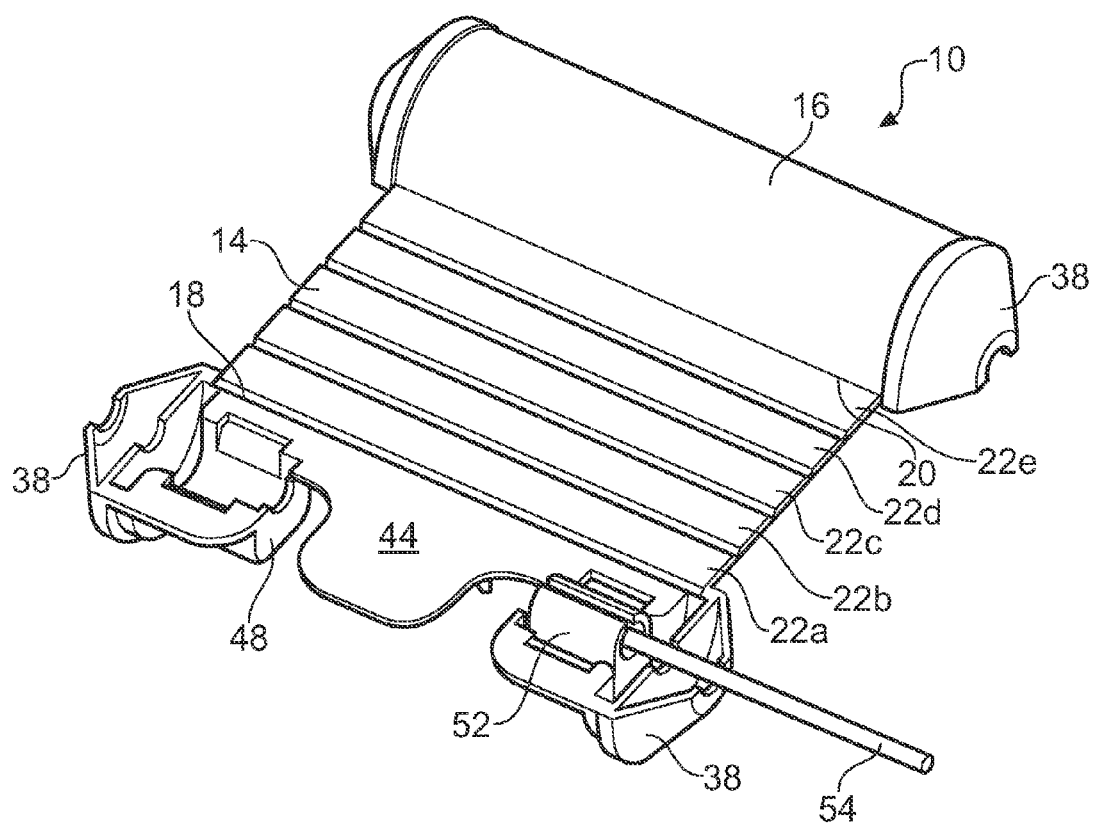
FIG. 2 is a perspective view of the device of FIG. 1 when viewed from the other side (the underside) of FIG. 1; and, FIG. 3 is a perspective view of the device of FIGS. 1 and 2 in its closed configuration.

In the open configuration of the device, as shown in the drawings of FIGS. 1 and 2, the organiser 14 is arranged in the form of a substantially flat rectangular tray which is pivotally connected along one of its longer side edges 18 to the side of the body member 12 and pivotally connected along the other of its longer edges to the closure member 16. The organiser comprises a plurality of parallel fold lines 21 which divide the organiser tray into a plurality of adjacent parallel strips 22a-e. The strips 22a-e are hinged together along their respective adjoining edges by the fold lines. The fold lines are provided by respective living hinges which are co-moulded with the parallel strips of the tray in a known manner. The living hinges have a thickness dimension of between 0.3 and 0.4 mm to permit pivoting of the parallel strips to allow the organiser tray to be wrapped around the outside of the body member 12 to close that part of the closure as will be described in more detail below. In the illustrated embodiment the organiser tray includes five strips arranged side-by-side between the body member 12 and closure member 16. The organiser 14 is pivotally connected to the body member and closure member by respective living hinge connections along respective edges 18 and 20.

The device 10 is an integrally moulded unit in which all the pivotal connections between the respective parts are provided by respective living hinges. The unitary device 10 is preferably moulded from a thermoplastics material with the living hinges being co-moulded during the moulding process.

As can be seen in the drawing of FIG. 1 splice holders 26 are provided on one of the strips 22e of the organiser tray for supporting cable splices (not shown) in use. A pair of L-shaped tabs 28 are provided at opposite ends of the middle strip 22c of the organiser tray for loosely restraining loops of excess fibre (not shown) which are supported on the surface of the organiser tray in use. Three additional upstanding L-shaped tabs 30 are provided on the first of the strips 22a along the adjoining edge 18 with the body member 12. The tabs 28 and 30 face towards the interior of the organiser tray and as previously mentioned act to constrain the extent of the looped fibre within the periphery of the tray when supported on the organiser tray in use.

A series of upstanding tabs 34, 36 are provided at opposite ends of the strips 22a, b, d and e to restrain the extent of the looped fibre on the tray and also to provide a degree of stiffening when the flexible tray is wrapped around the body member 12. It is to be understood that when the tray is wrapped around the outside of the body member to close that part of the closure the sides of the respective tabs 28, 34, 36 will come into contact with each other and restrict the angular movement of the adjacent strips 22a-e so that the strips provide an approximate continuous cylindrical surface around the outside of the body member 12.

The body member 12 and closure member 16 are in the form of approximate cylindrical half shells of substantially the same size with each having tapered conical end portions 38 provided with semi-circular openings 39 at their respective ends for receiving the ends of respective incoming/outgoing optical fibre cables.

The closure member is provided with three internal axially spaced semi-circular stiffening ribs 40. The ribs are each provided with a semi-circular central aperture 42 for supporting the main body of the cables fed into the device.

The body member and the organiser tray together form one half of a cylindrical closure and organiser device when the organiser tray is wrapped around the body member. The body member has a slightly different shape to the closure member 16 and comprises a flat planar portion 44 which is substantially co-planar with the organiser tray 14 when rolled flat as shown in the drawings of FIGS. 1 and 2. The conical end portions 38 are formed on one side of the planar portion 44 and on the interior side the conical end portions 38 are stepped to provide reduced diameter half cylindrical shoulders 46 which are engaged by the end portions of the strips 22 at the edge of the organiser tray. The body portion is also provided with respective upstanding substantially rectangular blocks 48 adjacent to the shoulders 46 against which the ends of the upstanding tabs 28, 34, 36 engage when the tray is wrapped around the body member. Engagement of these tabs with the surface of the blocks 48 assists in maintaining the shape and structure of the organiser tray when it is wrapped around the body 12. As will be explained in more detail with reference to the drawing of FIG. 2 the blocks 48 are substantially hollow for receiving the terminated ends of incoming/outgoing cables to the device on the underside of the body member. The surface of the planar portion 44 shown in the view of FIG. 1 is provided with a pair of curved fibre guides 50 which direct lengths of excess fibre from terminated cables into the region of the organiser tray where the loops of excess fibre and splices are located in use.

Referring now to the drawing of FIG. 2 which shows the other side of the device of FIG. 10 in the open unfolded configuration of the device. As previously mentioned the rectangular blocks 48 are substantially hollow on the underside of the body member and are specifically shaped and sized to define cable termination retention means for receiving respective optical fibre strain relief cable termination devices 52 which terminate the incoming optical fibre cable 54 and secure that cable with strain relief with respect to the body member 12 in a manner well known to those skilled in the art, for example as described in the applicant's European Patent EP-B-1,373,954. In the drawing of FIG. 2 only one cable 54 and cable termination device 52 are shown with the other of the cable termination receiving means at the other axial end of the device being shown without a respective cable termination device located therein. As can be seen from the drawing the cable termination retention blocks 48 are located in line with each other at opposite ends of the body member on its under side opposite the side around which the body member is wrapped to close the organiser tray. When located in the retention blocks 48 the cable termination devices 52 project beyond the plane of the planar portion 44 on the underside of the body member. When the organiser tray is wrapped around the other side of the body member and the closure member is closed against the underside of the body member the retention devices 52 project into the respective regions at the ends of the closure member between the conical end portions and the first of the stiffening ribs 40.

Figure 3:
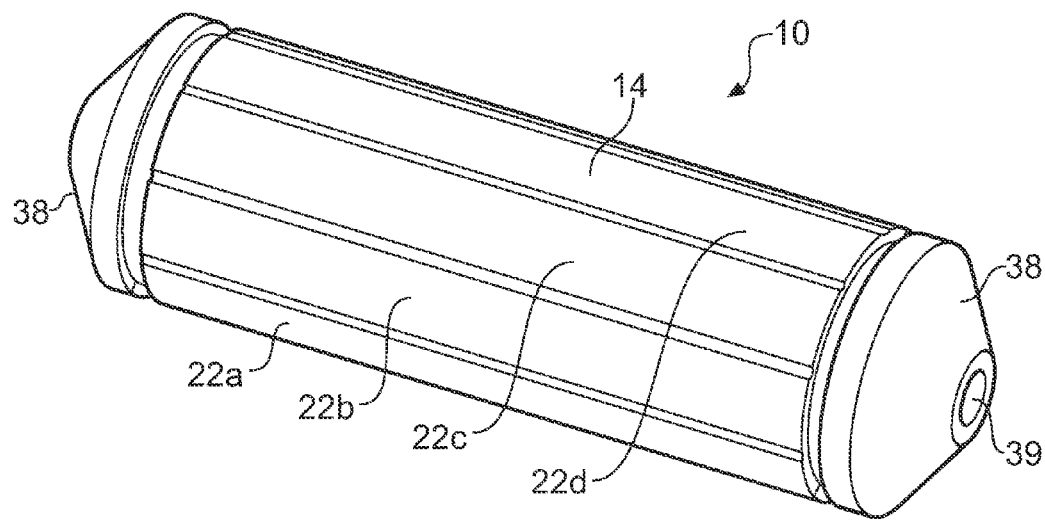

The cable termination devices 52 effectively form a snap-fit connection into the retention block openings and when properly secured and splicing of the appropriate fibres is achieved the device is closed by wrapping the organiser tray part around the other side of the body part to close the organiser tray against the open part of the body member and then closing the closure member against the underside of the body part to close the entire device as shown in the drawing of FIG. 3. It will be understood that the circumference of the cylindrical body part 12 is identical to the width of the organiser tray so that when it is folded around the cylindrical part of the body member the closure member is aligned with the underside of the body member so that further pivoting of the closure member about its respective living hinge closes the closure member around the underside of the body to close the device.

The invention claimed is:

1. A splice closure and fibre organiser device comprising a substantially elongate body and a foldable organiser tray having holding members for accommodating at least one fibre splice and/or length(s) of excess fibre, the tray having a plurality of fold lines defining individual strips connected end to end and being capable of being wrapped around at least part of the body, into a generally cylindrical or part cylindrical shape, to close or partially close the closure, with the holding members on the inside of the closure.

2. A device as claimed in claim 1, wherein the organiser tray comprises a plurality of adjacent parallel strips hinged together along their respective adjoining edges.

3. A device as claimed in claim 2, wherein the adjoining edges of adjacent strips are joined together by respective living hinges.

4. A device as claimed in claim 2, wherein the adjoining edges of adjacent strips are joined together by respective mechanical hinges.

5. A device as claimed in claim 3, wherein the living hinges are co-moulded with the strips.

6. A device as claimed in claim 5, wherein the living hinge has a thickness of between 0.2 and 0.5 mm.

7. A device as claimed in claim 6, wherein the living hinge has a thickness of between 0.3 and 0.4 mm.

8. A device as claimed in claim 1, wherein the organiser tray is pivotally connected to the body.

9. A device as claimed in claim 1, wherein the organiser tray is closed against the body when the tray is wrapped around the body.

10. A device as claimed in claim 1, wherein the body comprises at least one cable termination retention means for securing incoming/outgoing cables with respect to the body.

11. A device as claimed in claim 10, wherein the organiser tray is capable of being wrapped around part of the body on one side thereof and the retention means is/are located on the other side thereof.

12. A splice closure and organiser as claimed in claim 11, wherein the body is in the shape of a half cylinder and the organiser tray is pivotally connected along one of its sides to the half cylinder along an axial edge thereof.

13. A splice closure and organiser as claimed in claim 12, wherein the retention means is/are located on an outward facing surface of a substantially planar part of the half cylinder and the organiser is arranged to be wrapped around the non-planar part of the half cylinder to close that side of the body.

14. A splice closure and organiser as claimed in claim 13, further comprising a closure member and wherein the organiser is pivotally connected along the other of its sides to the closure member so that the closure member is capable of being brought into proximity with the body to close the other side of the body.

15. A splice closure and organiser as claimed in claim 14, wherein the closure member is in the shape of a half cylinder having a size substantially the same as the body such that when brought together the two half cylinders define co-operating halves of a cylindrical closure.

16. A splice and closure organiser as claimed in claim 15, wherein the interior of the half cylindrical closure member includes at least one guide for guiding incoming and/or outgoing cables within the closure.

17. A fiber closure, comprising:
 a substantially elongate body; and
 a foldable organizer tray for accommodating at least one fiber, the tray having a plurality of fold lines defining individual strips connected end to end and being capable of being wrapped around at least part of the body to at least partially close the closure, wherein the foldable organizer tray is foldable into a generally cylindrical or part cylindrical shape.

18. A device as claimed in claim 17, wherein the organiser tray comprises a plurality of adjacent parallel strips hinged together along their respective adjoining edges.

19. A device as claimed in claim 17, wherein the organiser tray is pivotally connected to the body.

20. A device as claimed in claim 17, wherein the body comprises at least one cable termination retention means for securing incoming/outgoing cables with respect to the body.

21. A splice closure and fibre organiser device comprising a substantially elongate body and a foldable organiser tray for accommodating at least one fibre splice and/or length(s) of excess fibre, the tray having a plurality of fold lines defining individual strips connected end to end, wherein the body comprises at least one cable termination retention means for securing incoming/outgoing cables with respect to the body and the organiser tray being capable of being wrapped around part of the body on one side thereof into a generally cylindrical or part cylindrical shape, to close or partially close the closure, and the retention means being located on the other side thereof.

22. A device as claimed in claim 21, wherein the organiser tray comprises a plurality of adjacent parallel strips hinged together along their respective adjoining edges.

23. A device as claimed in claim 22, wherein the adjoining edges of adjacent strips are joined together by respective living hinges.

24. A device as claimed in claim 23, wherein the living hinges are co-moulded with the strips.

25. A device as claimed in claim 21, wherein the organiser tray is pivotally connected to the body.

26. A device as claimed in claim 21, wherein the organiser tray is closed against the body when the tray is wrapped around the body.

27. A splice closure and organiser as claimed in claim 21, wherein the body is in the shape of a half cylinder and the organiser tray is pivotally connected along one of its sides to the half cylinder along an axial edge thereof.

28. A splice closure and organiser as claimed in claim 21, further comprising a closure member pivotally connected to the organiser tray so that the closure member is capable of being brought into proximity with the body to close the other side of the body.

29. A splice closure and organiser as claimed in claim 28 wherein the closure member and the body are in the shape of half cylinders such that when brought together the two half cylinders define co-operating halves of a cylindrical closure.

30. A splice and closure organiser as claimed in claim 29, wherein the interior of the half cylindrical closure member includes at least one guide for guiding incoming and/or outgoing cables within the closure.

31. A splice closure and fibre organiser device comprising:
 a substantially elongate body;
 a foldable organiser tray for accommodating at least one fibre splice and/or length(s) of excess fibre; and
 a closure member; wherein
 the elongate body and the closure member are positioned at opposite ends of the foldable organizer tray, and the foldable organiser tray being capable of being wrapped around, and enclose, at least part of a first side of the elongate body, and the closure member being movable to overlie a second side of the elongate body forming a closed shape.

32. A device as claimed in claim 31, wherein the organiser tray comprises a plurality of adjacent parallel strips hinged together along their respective adjoining edges.

33. A device as claimed in claim 31, wherein the elongate body has at least one cable termination retention means for securing incoming/outgoing cables with respect to the body.

* * * * *